United States Patent
Manchala et al.

(10) Patent No.: US 10,291,407 B2
(45) Date of Patent: May 14, 2019

(54) METHOD TO VERIFY INTEGRITY OF PROMOTIONAL BILLING DATA WHILE PRESERVING PRIVACY

(75) Inventors: Daniel W. Manchala, Torrance, CA (US); Steven J. Harrington, Webster, NY (US)

(73) Assignee: XEROX CORPORATION, Norwalk, CT (US)

( * ) Notice: Subject to any disclaimer, the term of this patent is extended or adjusted under 35 U.S.C. 154(b) by 607 days.

(21) Appl. No.: 12/131,325

(22) Filed: Jun. 2, 2008

(65) Prior Publication Data

US 2009/0299832 A1   Dec. 3, 2009

(51) Int. Cl.
G06Q 30/00 (2012.01)
H04L 9/32 (2006.01)
G06Q 30/02 (2012.01)

(52) U.S. Cl.
CPC .......... H04L 9/3236 (2013.01); G06Q 30/02 (2013.01); G06Q 30/0207 (2013.01); G06Q 30/0283 (2013.01); H04L 9/3247 (2013.01); H04L 2209/56 (2013.01)

(58) Field of Classification Search
CPC ............. G06Q 30/0241; G06Q 30/042; G06Q 30/0251; G06Q 30/0253; G06Q 30/02; G06Q 30/0207; G06Q 30/0283; H04L 9/3236; H04L 9/3247; H04L 2209/56
USPC ............ 705/14.4, 14.41, 14.43, 14.49, 14.69
See application file for complete search history.

(56) References Cited

U.S. PATENT DOCUMENTS

| | | | |
|---|---|---|---|
| 5,915,022 A * | 6/1999 | Robinson et al. | 705/75 |
| 5,956,698 A * | 9/1999 | Lacheze et al. | 705/34 |
| 6,549,935 B1 * | 4/2003 | Lapstun | B41J 2/17503 709/204 |
| 6,985,249 B2 | 1/2006 | Klassen et al. | |
| 7,031,015 B2 | 4/2006 | Vidyanand | |
| 7,061,630 B2 | 6/2006 | Murray | |
| 7,188,137 B2 * | 3/2007 | Inoue et al. | 709/203 |
| 8,464,302 B1 * | 6/2013 | Liwerant | H04N 21/2181 725/105 |
| 2001/0054008 A1 * | 12/2001 | Miller et al. | 705/26 |
| 2002/0087409 A1 * | 7/2002 | Joao | 705/14 |
| 2002/0138335 A1 * | 9/2002 | Palmer et al. | 705/10 |
| 2002/0152183 A1 * | 10/2002 | Soares et al. | 705/400 |
| 2003/0208560 A1 * | 11/2003 | Inoue et al. | 709/219 |
| 2004/0117305 A1 * | 6/2004 | Meier et al. | 705/40 |

(Continued)

OTHER PUBLICATIONS

An Introduction to Cryptography. Network Associates, Inc. 1999. Front matter and pp. 11-14 included.*

(Continued)

*Primary Examiner* — Raquel Alvarez
(74) *Attorney, Agent, or Firm* — Fay Sharpe LLP

(57) ABSTRACT

Systems and methods are described that facilitate capturing promotional information details such as the number of promotional material items printed for a given vendor supported by a marketing agency, item size, placement details, price, and authentication information to prove that a print log or summary is genuine. The authentication information can include a timestamp, printer identity, job identity and run-length. This information is summarized in a message digest and is signed by the printing system using digital signatures, which are then verified by the marketing agency through a public key counterpart of a private key used to generate the signatures.

19 Claims, 4 Drawing Sheets

(56) References Cited

U.S. PATENT DOCUMENTS

| | | | |
|---|---|---|---|
| 2004/0210483 A1* | 10/2004 | Watkins et al. | 705/14 |
| 2004/0215508 A1* | 10/2004 | Rebenack et al. | 705/14 |
| 2004/0215559 A1* | 10/2004 | Rebenack et al. | 705/40 |
| 2006/0010035 A1* | 1/2006 | Allen et al. | 705/14 |
| 2006/0082816 A1* | 4/2006 | Daniel | H04N 1/00204 358/1.15 |
| 2006/0212354 A1* | 9/2006 | Wolf et al. | 705/14 |
| 2007/0061196 A1* | 3/2007 | Axe et al. | 705/14 |
| 2007/0168251 A1* | 7/2007 | Hilbert et al. | 705/14 |
| 2008/0221982 A1* | 9/2008 | Harkins et al. | 705/14 |
| 2009/0171775 A1* | 7/2009 | Cashion et al. | 705/14 |

OTHER PUBLICATIONS

Menezes, A. J., Oorschot Paul C. Van, and Scott A. Vanstone. "Chapter 9—Hash Functions and Data Integrity." Handbook of Applied Cryptography. Boca Raton: CRC, 1997. Web. <http://cacr.math.uwaterloo.ca/hac>.*

Menezes, A. J., Oorschot Paul C. Van, and Scott A. Vanstone. "Chapter 8—Public KEy Encryption." Handbook of Applied Cryptography. Boca Raton: CRC, 1997. Web. <http://cacr.math.uwaterloo.ca/hac>.*

White, Ron. "Chapters 1-9, 14-31." How Computers Work, Millennium Edition. Indianapolis, IN: Que, 1999. Print.*

Handbook of Applied Cryptography. Menezes et al. CRC Press, 1996. Available from <http://www.cacr.math.uwaterloo.ca/hac>. Chapter 11 included.*

Handbook of Applied Cryptography. Menezes et al. CRC Press, 1996. Available from <http://www.cacr.math.uwaterloo.ca/hac>. Chapter 10 included.*

Handbook of Applied Cryptography. Menezes et al. CRC Press, 1996. Available from <http://www.cacr.math.uwaterloo.ca/hac>. Chapter 1 included.*

Handbook of Applied Cryptography. Menezes et al. CRC Press, 1996. Available from <http://www.cacr.math.uwaterloo.ca/hac>. Chapter 12 included.*

"Freebies" and Privacy: What Net Users Think by Alan Westin, http://cache.search.yahoo-ht2.akadns.net/search/cache . . . , accessed Jun. 2, 2008, 5 pgs.

Weiss, R. M. and A. K. Mehrotra (2001). "Online Dynamic Pricing: Efficiency, Equity and the Future of E-commerce." Virginia Journal of Law and Technology 6(11).

George J. F. (2002). "Influences on the Intent to Make Internet Purchases." Internet Research 12(2): 165-180.

Murthi, B. P. S. and S. Sarkar (2002). "The Role of the Management Sciences in Research on Personalization." Review of Marketing Science Working Papers 2(2).

Gordon Bitko (2006) RFID in the retail sector. A methodology for analysis of policy proposals and their implications for Privacy, Economic Efficiency and Security, Ph.D. dissertation, Pardee Rand Graduate School.

* cited by examiner

METHOD TO VERIFY INTEGRITY OF PROMOTIONAL BILLING DATA WHILE PRESERVING PRIVACY

BACKGROUND

The subject application relates to combining promotional material with transactional material at a print facility and providing a digitally signed invoice to a marketing agency or other vendor while preserving consumer privacy. While the systems and methods described herein relate to promotional material printing applications, it will be appreciated that the described techniques may find application in other printing systems, other marketing applications, for example such as those used for on-line targeted marketing, and/or other privacy protection systems.

Print facilities print promotional materials based on a person's transaction information and charge marketing agencies based on the amount of promotional material printed without disclosing which promotional material has been printed on a person's transaction statement, in order to comply with privacy regulations. One problem with conventional systems is that there is no way to verify that the correct amount of promotional material has been printed for a person as claimed by the print facility. Neither is there a method to verify the number of persons receiving the various promotional materials.

Personalization is the process of gathering personal information that enables a firm to target products or services to match a customer's tastes. The customer is often an unknowing participant whose preferences are revealed through behavioral history. The Internet allows firms to engage in this behavioral history tracking activity by linking customer behavior with various data mining tools and behavioral models. One example of a firm engaging in this activity is the online retailer Amazon, which uses purchasing history, especially for items such as books and music, to offer recommendations, coupons, and bundles to customers.

As a result of both the Internet's potential for personalization, and activities by Amazon and others, recent research on information privacy has concluded that there are individuals concerned about information privacy. There appears to be a tripartite segmentation of individuals: fundamentalists who are extremely concerned about the uses of personal information, and resistant to any further privacy erosion; an unconcerned group who do not consider privacy issues; and a group of pragmatists, typically the bulk of the survey respondents, who have some concerns about privacy but are willing to sacrifice personal information if there are tangible benefits.

Other studies have found that beliefs about privacy and trustworthiness have a significant effect on purchasing intentions. The more an individual believes in information privacy, the more negative an attitude is toward Internet purchasing.

Other approaches to document integrity verification relate to ensuring that a document is not missing pages, does not contain undesired duplicate images or pages, etc., but do provide verification information to ensure that consumer information is protected in accordance with privacy regulations while providing a vendor with increased assurance that invoices and billing statements are accurate. Accordingly, there is an unmet need for systems and/or methods that facilitate overcoming the aforementioned deficiencies.

BRIEF DESCRIPTION

In accordance with various aspects described herein, systems and methods are described that facilitate authenticating vendor invoices for printed promotional material such as coupons or advertisements on consumer billing statements or the like. For example, a method for verifying the integrity of promotional billing data comprises receiving information related to promotional marketing material to be printed on consumer billing statements during a print job, and determining prices for individual promotional items printed on the billing statements. The method further comprises calculating a total job price for the print job by summing the prices for the individual promotional items printed during the print job, and encrypting a message digest, describing the printed promotional items printed for the print job, with a private key to generate a digital signature therefor. The digitally signed message digest is then sent to the vendor or marketing agency serving the vendor and decoded using a public key that corresponds to the private key used to encrypt the message digest.

According to another feature described herein, a system that facilitates the creation of verifiable promotional billing data comprises a marketing rules engine that receives transactional data that determines the promotional material to be printed on consumer billing statements and retrieves promotional items stored in a promotional items database during execution of a print job for a vendor. The system further comprises a print controller that receives promotional items selected by the marketing rules engine, job control instructions, and transactional data related to the consumer billing statements and controls printing of the consumer billing statements with promotional items thereon. The system additionally comprises a printer integrity module that receives promotional items information from the print controller summarizing the promotional items printed for the vendor during the print job, and generates and digitally signs a vendor bill including a message digest that describes print job information.

Yet another feature relates to an apparatus for authenticating printed promotional material billing information to a vendor or marketing agency, comprising means for retrieving promotional items stored in a promotional items database as a function of received promotional data describing promotional material printed on consumer billing statements during execution of a print job for a vendor, and means for controlling printing of the consumer billing statements with promotional items and for receiving promotional items identified by the means for retrieving. The apparatus further comprises means for authenticating printed promotional material billing information to a vendor, wherein the means for authenticating receives promotional items information from the means for controlling that summarize the promotional items printed for the vendor during the print job, including authenticity information, calculates a total job price for the print job by looking up and totaling prices for respective promotional items printed during the print job, and generates and digitally signs a message digest that describes print job information. Additionally, the apparatus comprises means for printing the consumer billing statements and prints the promotional items on the billing statements, and means for transmitting the message digest to one or more of the vendor and a marketing agency serving the vendor.

DETAILED DESCRIPTION

Figure 1:
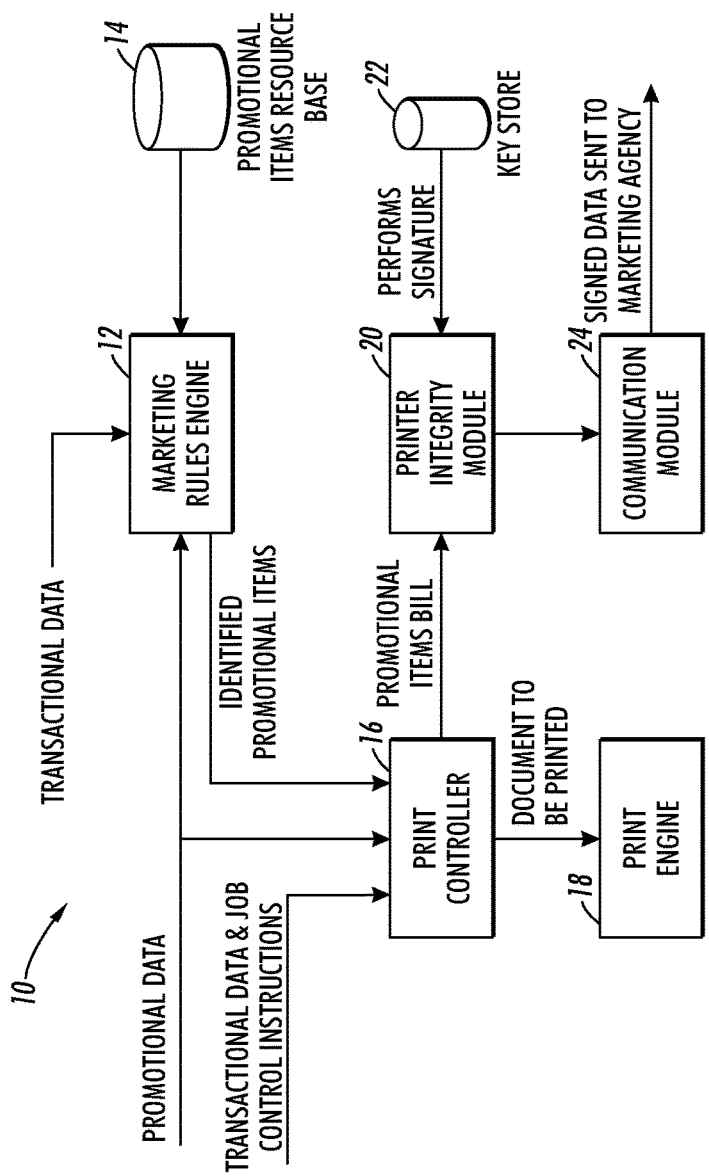
FIG. 1 illustrates a printer system that facilitates verification of the integrity of promotional billing data, in accordance with various aspects described herein.

In accordance with various features described herein, systems and methods are described by which marketing information is logged, such as the number of promotional material advertisements for a certain vendor supported by a marketing agency, advertisement size, placement details, price, and authenticity information showing that the log was genuine, (e.g., a timestamp, printer identity, job identity, run-length, etc.). This information is signed using digital signatures provided by a printing system and verified by the marketing agency through a public key counterpart of a private key used to generate the signatures.

Companies that deal with transactional data print billing statements at a print facility. Such companies include banks, utilities, regular service providers like telephone, cable TV, etc. Marketing agencies can utilize transactional data/information maintained at the print facility to direct product and services advertisements that are relevant to the consumers. Thus, marketing agencies can benefit from adding transaction-related vendor's promotional material to billing statements. This is called "targeted marketing." However, due to privacy regulations, the marketing agency may not be able to obtain access to relevant information necessary for targeted marketing, since almost all of the transactional data is private and is governed by various government privacy regulations.

Moreover, such data is a valuable asset for the print facility. At the least, the data includes the names, addresses, bank account information including spending and account numbers, and income and expenditure of individuals, corporations and families. The value of data increases as a network of relationships is established among the data items, for example, a relationship graph can relate which promotional material was printed on what statements, the purchases on the statements, the date and value of the purchases, and dependent purchases. This enriched data is turned into knowledge that can be used to model a consumer.

The print facility may not wish to share any part of this knowledge with other entities, such as a marketing agency. Thus, it is advantageous for the print facility to stay involved in the data enrichment process to generate revenue. However, the print facility may have to reveal certain limited information to the marketing agency for billing purposes. The less the print facility reveals such information, the more the data is safeguarded as well as kept private. For instance, the marketing agency could employ sophisticated data mining tools to reconstruct, harvest, and enrich such data to create targeted marketing knowledge. As the amount of information sent to the marketing agency is reduced, the amount of trust related to the information can decrease. In other words, the less information the print facility provides to the marketing agency regarding services performed, the less the marketing agency is able to verify the accuracy of the invoice for the services performed. The described systems and methods facilitate validating the integrity of invoices and bills by capturing and digitally signing invoice data at the print facility while mitigating opportunity for a man-in-the-middle attack by the print facility owner, employee, a network hacker, etc.

With reference to FIG. 1, a printer system 10 that facilitates verification of the integrity of promotional billing data is illustrated, in accordance with various aspects described herein. The system comprises a marketing rules engine 12 that receives marketing/promotional information from a marketing agency and/or vendor. The promotional data may include, without being limited to: size (area) of each promotional item (ads, coupons, etc); color content of the promotional item(s); overall placement ($1^{st}$ page, middle pages, last page, etc.); placement position on a page (top left, bottom right, middle across, etc.); identity of the vendor whose promotional material is printed; identity of the marketing agency employed by the vendor; authenticity information (e.g., timestamp, printer identity, job identity, run length, etc.); etc. The marketing rules engine also accesses a promotional items resource database 14 that includes promotional items to be printed on documents for the vendor (e.g., coupons, sales advertisements, etc., printed on customer bills or the like). The marketing rules engine 12 outputs selected promotional items as a function of the transactional data to a print controller 16.

The print controller 16 receives the promotional data, as well as transactional data and job control instructions. The print controller 16 outputs document data to a print engine 18 to be printed. Additionally, the print controller 16 outputs a promotional items bill to a printer integrity module 20 that accesses a key store 22 (e.g., a database) to retrieve a private key that is used to encrypt and digitally sign the promotional items bill. The printer integrity module 20 then outputs the digitally signed bill to a communication module 24 that sends the signed billing data to a marketing agency or vendor.

According to an example, each billing statement provided to the printer integrity module 20 includes details of marketing information (e.g., ad or coupon size, color content, placement, position, vendor ID, agency ID, etc.). Based on this information, the printer integrity module 20 calculates the price to be charged for printing by performing a table lookup on a price table (e.g., stored in persistent memory in the printer integrity module). An example of a pricing table for a color advertisement on glossy paper is presented in Table 1 below.

TABLE 1

| Size (area) | Placement (top left) | Placement (bottom right) | Placement (middle across) | $1^{st}$ page Xlier. |
| --- | --- | --- | --- | --- |
| 2.8-3.2 sq. in | $0.50 | $0.47 | $0.80 | 2x |
| 3.2-4.7 sq. in | $0.75 | $0.70 | $0.90 | 2.5x |
| 4.8-5.6 sq. in | $0.96 | $0.90 | $1.20 | 3x |
| 5.7-9.0 sq. in | $1.07 | $1.00 | $4.30 | 10x |

A similar table for black-and-white or highlight-color can also be used. Table 1 shows examples of prices for a single promotional item when printed on a statement in color on glossy paper for a certain size (given by area), placement, and a multiplication factor on the price if it is on the first page versus other pages.

The printer integrity module 20 then calculates the price for all the statements (e.g., run length in this case may approximately be 300K to 500K or more) for each vendor/ marketing agency to create a summarized bill for the marketing agency. An example of such is shown in Table 2, below.

TABLE 2

Marketing agency: ABC Inc.
Id: AD2436702
Total to be paid: $7900.00

| Size | Placement | Unit cost | No. of units printed | Total cost | Vendor |
|---|---|---|---|---|---|
| 2.8-3.2 sq. in | Top left | 0.50 | 100 | 50.00 | XYZ1 |
| 3.2-4.7 sq. in | Middle across | 0.90 | 200 | 180.00 | XYZ2 |
| 3.2-4.7 sq. in | Top left 1$^{st}$ page | 1.875 | 1000 | 1875.00 | XYZ3 |

A message digest (e.g., representing a billing summary) of the above information is encrypted using a private key retrieved by the printer integrity module 20 from the key database 22 to form a digital signature, and is sent to the marketing agency. In another embodiment, a set of rows for each of a plurality of vendors using the marketing agency may be digitally signed so that the marketing agency can forward grouped sets of rows to each respective vendor for reimbursement and to provide further proof that the correct number and type of promotional items were printed. The marketing agency or the vendor can in turn verify the signature using a corresponding public key provided by the printer integrity module 20. Public keys can be obtained from the manufacturer of the system or from the print facility if the print facility stores the public keys. In an alternate embodiment, certified public keys may be obtained in the form of a digitally signed certificate from a certificate authority. The private key in each printer's printer integrity module is built into it by the printer manufacturer, and is protected and thus updated using the printer manufacturer's field engineer's hardware key tokens, bio-metrics, etc.

For example, a print facility can purchase a printer from a printer manufacturer. The printer manufacturer provides a unique private key in the printer, which the printer uses to create a digital signature, thereby imparting a tamper-proof feature to the printer. The signature provides proof that specified promotional material was printed, along with specifics related to the promotional material (e.g., placement, size, color, etc.). Additionally, the printer can print a log of promotional material printed for one or more vendors served by a marketing agency that employs the print facility, and can digitally sign each log. The marketing agency then employs a public key provided by the printer manufacturer to verify the integrity of each log entry before making payment to the print facility. In one embodiment, the signed log entry or message digest is sent to the marketing agency via email or the like upon completion of the print job.

An example of a digital signature is shown below:

```
-------BEGIN SIGNATURE------
IQB1AwUBMVSiA5QYCuMfgNYjAQFAKgL/
ZkBfbeNEsbthba4BlrcnjaqbcKgNv+a5kr4537y8RCd+RHm
75yYh5xxA1ojELwNhhb7cltrp2V7LlOnAelws4S87UX80cL
BtBcN6AACfl1qymC2h+Rb2j5SSU+rmXWru+=QFMx
-------END SIGNATURE------
```

Cryptographic algorithms used for digital signatures include Digital Signature Algorithm (DSA), RSA's Probabilistic Signature Scheme (RSA-PSS). Algorithms used for creating a message digest include Message Digest 5 (MD5) algorithm, Secure Hash Algorithm (e.g., SHA-1/2, etc.), etc. The XML digital signature standard prescribes a method of signing the above data contained in a uniform resource identifier (URI) by individually creating a digest of each of the resources, collecting them into a <SignedInfo> element, and signing the entire element. The signed element is passed to the recipient by adding "KeyInfo" such as an X.509 certificate that contains the public key or the like.

As shown in FIG. 1, the printer integrity module 20 collects the information described above from the print controller 16 and signs the data using a private key from the key store 22. This signed information is communicated to the marketing agency through the communication module 24. The communication module can include a transceiver, modulator/demodulator, and any other suitable components for communicating via, for instance, a wireless connection, the Internet, or the like.

The marketing rules engine 12 applies additional rules that are pre-designed for given types of transactional data. For instance, promotional items having certain colors may not be suitable for printing as background beneath text, etc. Transactional data is merged with promotional data in the print controller 16 and is then sent to the print engine to be printed 18. A finisher (not shown) can fold, insert into an envelope, and mail the documents to consumers.

It will be appreciated that any or all of the marketing rules engine 12, the print controller 16, the print engine 18, the printer integrity module 20, and the communication module 24 comprise a processor (not shown) that executes, and/or a memory (not shown) that stores, machine-executable instructions and/or software for carrying out the various functions, calculations, and/or actions described herein. For instance, a processor in the printer integrity module can execute software instructions for performing a price table lookup, for calculating prices for individual jobs, groups of jobs, total price for each vendor, etc. A processor in the marketing rules engine 12 can execute stored instructions for data mining consumer data to identify promotional material that is relevant to consumer purchases, to retrieve promotional data from the promotional items resources database 14, etc. Moreover, processors in respective components can execute instructions for communicating with one another, for selectively transmitting raw and/or processed data to each other, storing received and/or processed data in respective persistent memories and/or buffers, and the like, as will be appreciated by those of skill.

According to another example, the marketing rules engine 12 receives transactional information including consumers' credit card statements. The marketing rules engine 12 executes a data mining algorithm to identify products and/or purchases made by individual consumers, and retrieves promotional items relevant to respective consumers purchasing history. For instance, if a given credit card bill has several clothing purchases, then the marketing rules engine 12 makes an inference that promotional material related to clothing is relevant to that consumer, and retrieves clothing-related promotional material (e.g., coupons, sale information, etc.) and forwards it to the print controller 16 along with information identifying the credit card bill on which the clothing-related promotional material is to be printed.

In a related example, the system 10 may be processing a batch of billing statements for a seller of, for instance, lawn care equipment. The marketing rules engine 12 may identify billing statements that include a purchase of a lawn mower. Since consumers typically buy a lawnmower rather infrequently, the marketing rules engine 12 may infer that promotional material related to lawnmowers need not be included on billing statements showing a lawnmower purchase. Rather, the marketing rules engine 12 may make an inference that lawnmower accessories (e.g., lawn refuse bags, sparkplugs, oil, maintenance kits, etc.) and other lawn care tools (leaf blowers, edgers, etc.) are relevant, and may retrieve promotional material related thereto.

Figure 2:
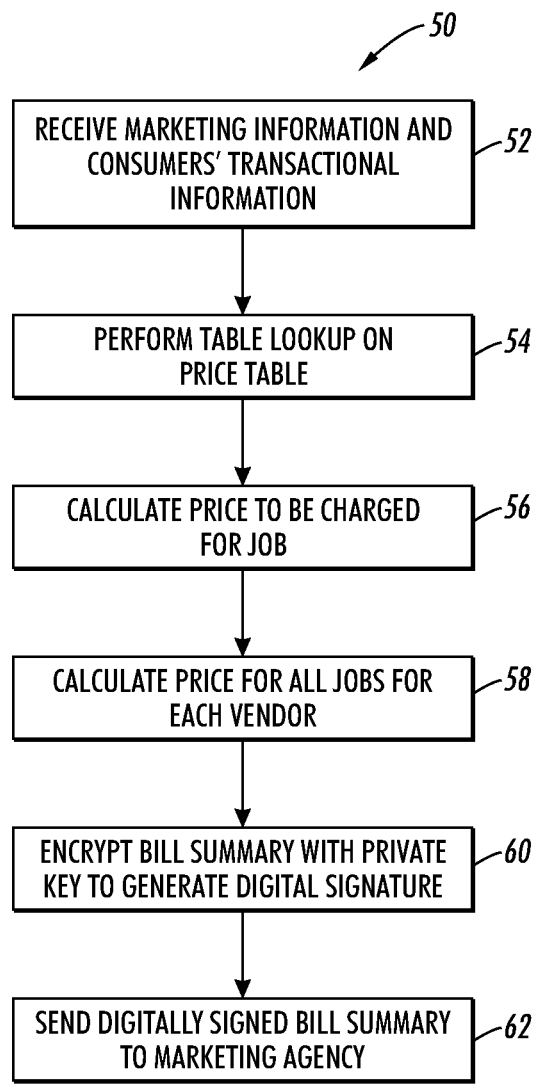
FIG. 2 illustrates a method for generating digital signatures for verification of billing summary information for vendors and marketing agents while protecting consumer information in accordance with privacy regulations, in accordance with various aspects described herein.
Figure 3:
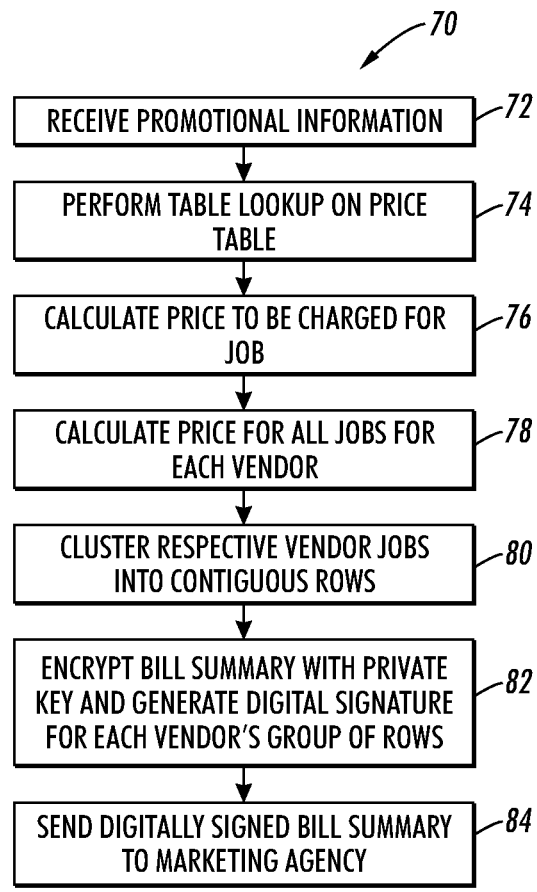
FIG. 3 is an illustration of a method for digitally signing billing summary information contained in a single message digest for each of a plurality of respective vendors, in accordance with various aspects described herein.
Figure 4:
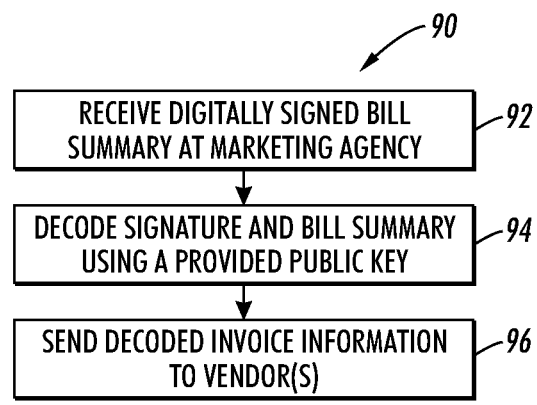
FIG. 4 illustrates a method for verifying printed promotional material billing information integrity while protecting consumer privacy, in accordance with various aspects described herein.

FIGS. 2-4 illustrate a methods related to billing data integrity verification, in accordance with various features. While the methods are described as a series of acts, it will be understood that not all acts may be required to achieve the described goals and/or outcomes, and that some acts may, in accordance with certain aspects, be performed in an order different that the specific orders described.

FIG. 2 illustrates a method 50 for generating digital signatures in order to provably verify promotional billing summary information for vendors and marketing agents while protecting consumer information in accordance with privacy regulations, according to various aspects described herein. At 52, marketing/promotional information and consumers' transactional information (e.g., bank statements, credit/debit card purchases, etc.) is received, which may include without being limited to promotional material type, size, color, placement within a group of pages, position on a page, vendor and/or marketing agent ID information, etc., as well as verification information such as timestamps related to printing of the promotional items, printer identity, job length, run time, etc. At 54, a table lookup is performed to determine price for promotional material to be printed, as a function of the transactional information received at 52. At 56, the price for a current print job is determined by adding the prices for the various types, sizes, colors, etc. of promotional materials printed, as indicated in the promotional information.

At 58, the aggregate price for all print jobs performed for each vendor is calculated. For example, if there are two vendors for whom promotional material is being printed on billing statements or the like, then steps 52, 54, 56, and 58 are performed for each vendor. At 60, a message digest (e.g., for a bill or invoice summary or the like) comprising invoices or bills for each vendor is digitally signed using a private key, which may be provided by the manufacturer of the printer performing the print jobs and generating the message digest. The encrypted, signed message digest is sent to a marketing agency or the like, at 62. The marketing agency can then verify the digital signature (e.g., using a public key provided to the agency) and separate out the vendor's individual bill statements for bill the vendors. In another example, a vendor's promotional billing information is encrypted, signed, and sent directly to the vendor by the printer.

FIG. 3 is an illustration of a method 70 for digitally signing billing summary information contained in a single message digest for each of a plurality of respective vendors, in accordance with various aspects described herein. At 72, marketing information (e.g., promotional material type, size, color, placement within a group of pages, position on a page, vendor and/or marketing agent ID information, etc.) is received, as well as authenticity information such as timestamps related to printing of the promotional items, printer identity, job length, run time, etc. At 74, a table lookup is performed to determine price for promotional items to be printed. At 76, the price for a current print job is determined by summing the prices for the promotional items to be printed by the printer.

The total price for all print jobs performed for each vendor is calculated, at 78. For example, if there are two or more vendors for whom promotional material is being printed on billing statements or the like, then steps 72, 74, 76, and 78 are performed for each vendor. At 80, respective vendor jobs and related data (e.g., billing information) are grouped for each vendor. At 82, a message digest (e.g., representing a bill summary or the like) comprising invoices or bills for all vendors is encrypted using a private key, and each vendor's group of invoice data rows is individually digitally signed. The private key is provided by the manufacturer of the printer performing the print jobs and generating the message digest. The encrypted, signed message digest is sent to a marketing agency or the like, at 84. The marketing agency can then decode the message digest (e.g., using a public key provided to the agency).

Because the respective vendors' invoice data was grouped at 80, the marketing agency need not spend time parsing through the invoice data to collect each individual vendor's invoice data. Rather, the agency can decode each vendor's invoice data and send it to respective vendors. Alternatively, the agency can send the digitally signed invoice data to each respective vendor, and let each vendor verify the signature on its invoice data using a provided public key. In another example, a vendor's invoice summary is encrypted, signed, and sent directly to the vendor for decoding.

FIG. 4 illustrates a method 90 for verifying printed promotional material billing information integrity while protecting consumer privacy, in accordance with various aspects described herein. At 92, a promotional material marketing agency or the like receives a digitally signed bill for printing promotional information from a printer in a print facility. At 94, the message digest is decoded to verify the integrity of an associated invoice or billing information. The marketing agency then provides billing information to respective vendors, at 96. The marketing agency and/or the vendors can the view the printer ID, timestamp, and other verification information to verify that the stated number, type, etc., of promotional items were in fact printed in accordance with the billing information.

Figure 5:
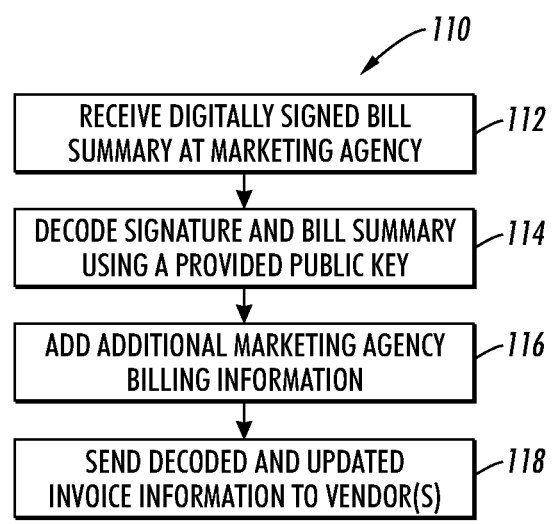
FIG. 5 illustrates a method for verifying printed promotional material billing information integrity while protecting consumer privacy and for adding marketing agency billing information, in accordance with various aspects described herein.

FIG. 5 illustrates a method 110 for verifying printed promotional material billing information integrity while protecting consumer privacy and for adding marketing agency billing information, in accordance with various aspects described herein. At 112, a promotional material marketing agency or the like receives a digitally signed bill for printing promotional information from a printer in a print facility. At 114, the message digest is decoded to verify the integrity of an associated invoice or billing information. At 116, the marketing agency adds its invoice information (e.g., middleman fees, etc.). The marketing agency then provides updated billing information to respective vendors, at 118, after supplementing it with the marketing agency's fees. The marketing agency and/or the vendors can the view the printer ID, timestamp, and other verification information to verify that the stated number, type, etc., of promotional items were in fact printed in accordance with the billing information.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method of verifying the integrity of promotional billing data, comprising:

receiving consumer transactional information and promotional information related to promotional items to be printed on consumer billing statements during a print job;

printing one or more of the promotional items and the transactional information on the billing statements for sending to respective consumers, the printing being performed by a print engine;

determining, via one or more processors, prices for individual promotional items printed on the billing statements, the prices being a function of a location of the respective promotional items on the billing statement;

calculating, via the one or more processors, a total job price for the print job by summing the prices for the individual promotional items printed during the print job;

encrypting, via the one or more processors, a message digest with a private key to generate a digital signature therefor, the message digest describing the printed promotional items printed for the print job and a bill summary therefor;

sending the digitally signed message digest to a marketing agency for verification of promotional item billing information in the bill summary and distribution to at least one vendor; and providing, via a printer integrity module, a public key for the at least one vendor to the marketing agency, which serves the at least one vendor, with instructions to the marketing agency to forward the digitally signed message digest to each respective vendor along with each vendor's public key for vendor verification of the signature on the vendor's invoice data;

wherein for each promotional item the promotional information includes information related to a size of each promotional item, overall placement, and placement position of the promotional item on the billing statements.

2. The method of claim 1, further comprising calculating a total price for a vendor when more than one print job is performed for the vendor by summing the total job prices for each job.

3. The method of claim 2, wherein the message digest describes each print job performed for the vendor.

4. The method of claim 3, further comprising providing a digital signature for each print job represented in the message digest.

5. The method of claim 2, further comprising calculating a total price for each of a plurality of vendors by summing job prices for print jobs performed for each vendor.

6. The method of claim 5, wherein the message digest describes each print job performed for each vendor, and wherein print jobs are grouped according to the respective vendor for which they were performed.

7. The method of claim 6, further comprising further comprising providing a unique digital signature for each group of print jobs represented in the message digest.

8. The method of claim 1, further comprising permitting the marketing agency to adjust the total price for each vendor by adding the marketing agency's fee to the total price for each vendor.

9. The method of claim 1, wherein determining prices for individual promotional items includes performing a table lookup.

10. A system that facilitates the creation of verifiable promotional billing data, comprising:

a marketing rules engine comprising a processor that receives transactional data, determines the promotional material to be printed on consumer billing statements, and, during execution of a print job for a vendor, retrieves promotional items stored in a promotional items database;

a print controller comprising a processor that receives promotional items selected by the marketing rules engine, job control instructions, and transactional data related to the consumer billing statements and controls printing of the consumer billing statements and the promotional items printed thereon;

a print engine that prints the consumer billing statements and prints the promotional items on the billing statements; and a printer integrity module comprising a processor that receives promotional information from the print controller summarizing the promotional items printed for the vendor during the print job, and generates and digitally signs a vendor bill including a message digest that describes print job information;

wherein the promotional information comprises:
overall placement of a promotional item on a multi-page consumer billing statement; and
placement position on a given page in the consumer billing statement(s); and
wherein the promotional information further comprises one or more of:
promotional item dimensions; and
color content of the promotional item(s);

wherein the printer integrity module calculates a total job price for the print job by determining and totaling the prices for respective promotional items printed during the print job, the prices being a function of a location of the respective promotional items on the billing statement; and wherein the promotional information received by the printer integrity module comprises an identity of the vendor whose promotional material is printed and an identity of the marketing agency employed by the vendor; and wherein the printer integrity module is further configured to provide a public key for the at least one vendor to the marketing agency, which serves the at least one vendor, with instructions to the marketing agency to forward the digitally signed message digest to each respective vendor along with each vendor's public key for vendor verification of the signature on the vendor's invoice data.

11. The system of claim 10, wherein the information received by the printer integrity module includes authenticity information.

12. The system of claim 11, wherein the authenticity information includes one or more of timestamp information for one or more of each job and each promotional item printed, and further includes printer identity, job identity, and job run length information.

13. The system of claim 10, wherein determining the prices for respective promotional items includes performing a table lookup of an item price as a function of respective item print properties.

14. The system of claim 10, further comprising a communication module that transmits the digitally signed vendor bill to one or more of the vendor and marketing agency serving the vendor.

15. The system of claim 10, further comprising a key database that stores private keys that are retrieved by the printer integrity module to digitally sign the vendor bill.

16. The system of claim 15, wherein the printer integrity module calculates a total job price for each of a plurality of print jobs for the vendor, summarizes print job information for each print job, and digitally signs the vendor bill using a private key stored in the key database.

17. The system of claim 16, wherein the printer integrity module calculates a total job price for each of a plurality of print jobs for each of a plurality of vendors, groups print job summaries for all print jobs for each respective vendor, and digitally signs each vendor's group of print job summaries in the message digest using a unique private key stored in the key database.

18. An apparatus for authenticating printed promotional material billing information to a vendor or marketing agency, comprising:
  a marketing rules engine that retrieves promotional items from a promotional items database as a function of received promotional information describing promotional items printed on consumer billing statements during execution of a print job for a vendor;
  a print controller that controls printing of the consumer billing statements with promotional items thereon and for receiving promotional items identified by the marketing rules engine;
  a printer integrity module that authenticates printed promotional item billing information to a vendor, wherein the printer integrity module receives promotional information from the print controller, the promotional information summarizing the promotional items printed for the vendor during the print job, including authenticity information, calculates a total job price for the print job by looking up and totaling prices for respective promotional items printed during the print job, the prices being a function of a location of the respective promotional items on the billing statement, and generates and digitally signs a message digest that describes print job information;
  a printer that prints the consumer billing statements and prints the promotional items on the billing statements; and
  a communication module that sends the message digest to one or more of the vendor and a marketing agency serving the vendor;
  wherein the promotional information comprises:
    one or more of promotional item dimensions and color content of the promotional item(s); and
    overall placement of a promotional item on a multi-page consumer billing statement, and placement position on a given page in the consumer billing statement; and
    an identity of the vendor whose promotional material is printed and an identity of the marketing agency employed by the vendor;
  wherein the printer integrity module is further configured to provide a public key for the at least one vendor to the marketing agency, which serves the at least one vendor, with instructions to the marketing agency to forward the digitally signed message digest to each respective vendor along with each vendor's public key for vendor verification of the signature on the vendor's invoice data.

19. The apparatus of claim 18, wherein:
the promotional information comprises an identity of the vendor whose promotional items are printed, and an identity of the marketing agency employed by the vendor; and
the message digest includes authenticity information comprising one or more of timestamp information for each job and/or each promotional item printed, printer identity, job identity, and job run length information.

* * * * *